United States Patent
Kanno

(10) Patent No.: US 10,216,294 B2
(45) Date of Patent: Feb. 26, 2019

(54) POSITION INDICATOR, AND PRODUCTION METHOD THEREFOR

(71) Applicant: Wacom Co., Ltd., Saitama (JP)

(72) Inventor: Teppei Kanno, Saitama (JP)

(73) Assignee: Wacom Co., Ltd., Saitama (JP)

( * ) Notice: Subject to any disclaimer, the term of this patent is extended or adjusted under 35 U.S.C. 154(b) by 2 days.

(21) Appl. No.: 15/369,548

(22) Filed: Dec. 5, 2016

(65) Prior Publication Data

US 2017/0083122 A1 Mar. 23, 2017

Related U.S. Application Data

(63) Continuation of application No. PCT/JP2015/057989, filed on Mar. 18, 2015.

(30) Foreign Application Priority Data

Jul. 10, 2014 (JP) .................................. 2014-142369

(51) Int. Cl.
G06F 3/044 (2006.01)
G06F 3/0354 (2013.01)

(52) U.S. Cl.
CPC .......... *G06F 3/03545* (2013.01); *G06F 3/044* (2013.01)

(58) Field of Classification Search
CPC ............................ G06F 3/03545; G06F 3/044
USPC .......................................... 345/156–158, 179
See application file for complete search history.

(56) References Cited

U.S. PATENT DOCUMENTS

| 5,754,166 A * | 5/1998 | Baba ........................ G05G 1/10 341/22 |
| 6,771,254 B2 | 8/2004 | An et al. |
| 8,576,203 B2 | 11/2013 | Nakata et al. |
| 2009/0262637 A1* | 10/2009 | Badaye ............... G06F 3/03545 369/126 |
| 2011/0261026 A1 | 10/2011 | Kim et al. |
| 2011/0316815 A1* | 12/2011 | Fang ................... G06F 3/03545 345/179 |
| 2012/0146957 A1* | 6/2012 | Dunagan ............. G06F 3/03545 345/179 |
| 2012/0146960 A1* | 6/2012 | Shih ........................ G06F 3/041 345/179 |

(Continued)

FOREIGN PATENT DOCUMENTS

| JP | 3022487 U | 3/1996 |
| JP | 4840891 B1 | 12/2011 |
| JP | 2012-226554 A | 11/2012 |

(Continued)

OTHER PUBLICATIONS

English Language Machine Translation of KR-101296286.*

(Continued)

*Primary Examiner* — Jason M Mandeville
(74) *Attorney, Agent, or Firm* — Seed IP Law Group LLP

(57) ABSTRACT

A position pointer used to input position pointing operations on a capacitive position detector includes a rod-shaped housing, a sleeve, a cap, a cloth, a support, and a first fastener. The sleeve is connected to a tip portion of the housing. The cap is made of an elastic material and protrudes from the tip portion of the sleeve. The cloth covers the cap. The support is provided inside the housing and supports the cap. The first fastener fastens the cloth to the support. At least one of the cap and the cloth is conductive.

7 Claims, 3 Drawing Sheets

(56) References Cited

U.S. PATENT DOCUMENTS

2013/0127791 A1* 5/2013 Siuta .................. G06F 3/03545
345/179

FOREIGN PATENT DOCUMENTS

| JP | 2013-65147 A | 4/2013 |
| JP | 2014-112355 A | 6/2014 |
| KR | 101296286 B1 * | 8/2013 |

OTHER PUBLICATIONS

International Search Report dated May 19, 2015, for corresponding International Application No. PCT/JP2015/05789, 2 pages.

* cited by examiner

POSITION INDICATOR, AND PRODUCTION METHOD THEREFOR

BACKGROUND

Technical Field

The present disclosure relates to a position pointer used for position pointing operations on a position detector, such as a touch panel display, and relates also to a manufacturing method thereof.

Description of the Related Art

Pen-type position pointers are known for operating capacitive position detectors. For example, the position pointer described in Patent Document 1 has an elastic member that is elastic and conductive and provided at a tip portion of a rod-shaped housing. Position pointing is conducted as a contact member comes in contact with a pointing input surface (touch panel). The elastic member is provided on the housing in an attachable and detachable manner. Therefore, if the contact member is worn, only the contact member can be replaced.

Further, Patent Document 2 discloses a position pointer (stylus) that has a pen tip structure the surface of whose base material is coated to provide a smooth pen tip.

PRIOR ART PATENT DOCUMENTS

Patent Document 1: Japanese Patent No. 4840891
Patent Document 2: U.S. Pat. No. 6,771,254

BRIEF SUMMARY

Technical Problem

Although the position pointer described in Patent Document 1 permits replacement of its contact member, the durability and operability of the contact member have not improved and should do so. On the other hand, the position pointer described in Patent Document 2 offers better durability and operability by coating of the surface of the pen tip. However, the pen tip coating wears out with its use, making the base material exposed and leading to poor ease of use. As a result, the durability should be improved further. In the meantime, although the surface of the hard and porous base material can be coated, it is difficult to coat, especially difficult to form a thick coating, on the surface of an elastic body. Further, coating is high in cost. Therefore, it is desired that the durability and operability should be improved in another way.

In light of the foregoing, it is an object of the present disclosure to provide a position pointer that offers improved durability and operability of its contact member through a simple configuration and a manufacturing method thereof.

Technical Solution

In order to solve the above problem, a position pointer according to the present disclosure is used for position pointing operations on a capacitive position detector. The position pointer includes a rod-shaped housing, a sleeve, a cap, a cloth, a support member, and a first fastening member. The sleeve is connected to a tip portion of the housing. The cap is made of an elastic material provided in such a manner as to protrude from the tip portion of the sleeve. The cloth covers the cap. The support member is provided inside the housing to support the cap. The first fastening member fastens the cloth to the support member. At least one of the cap and the cloth is conductive.

In the present disclosure, the tip surface of the cap, a contact member, is covered with a cloth. This keeps the cap out of direct contact with a pointing input surface of the position detector, thus providing improved durability of the cap. The cloth provides reduced frictional resistance, thus achieving smooth operability. Further, the first fastening member fastens the cloth by clamping. This makes it possible to change the position of a hem portion of the cloth, thus allowing for easy adjustment of wrinkle positions of the cloth and the hem portion length.

In the present disclosure, the first fastening member is preferably made of an elastic material. If an elastic material is used, the cloth can be readily fastened by clamping. In this case, the first fastening member is preferably an O-ring. This configuration allows for reliable fastening of the cloth with an extremely simple and inexpensive fastener and permits easy adjustment of wrinkles of the cloth and the hem portion length after fastening.

The position pointer according to the present disclosure preferably further includes a second fastening member that fastens the cloth hem portion to the support member. This configuration enables reliable fastening of the cloth. Further, spreading of the cloth hem portion can be kept to a minimum, thus providing a better look of the cloth-covered cap as a whole.

In particular, the second fastening member in the present disclosure should preferably fasten both the cloth hem portion and the first fastening member. This configuration allows for fastening of not only the cloth hem portion but also the first fastening member, thus ensuring more reliable fastening of the cloth.

In the present disclosure, the second fastening member is preferably a heat-shrinkable tube. This configuration brings the cloth hem portion into closer contact with the support member surface, thus providing an excellent look and permitting reliable fastening of the cloth.

In the present disclosure, the support member preferably includes a base member and a shaft member. The base member is attached to the housing. The shaft member is provided on the base member in an attachable and detachable manner. The cap is preferably attached to a tip portion of the shaft member. The first fastening member preferably fastens the cloth to the shaft member. If attached directly to the support member as is conventionally done, the cap can be detached from the support member for replacement. If the cap is covered with a cloth as in the present disclosure, it is difficult to detach only the cap from the support member for replacement. However, if the support member is divided into a base member and a shaft member, and the cloth is fastened to the shaft member as in a present embodiment, the cap covered with the cloth can be readily detached for replacement.

In the present disclosure, the shaft member preferably includes a head section, a neck section, a flange section, a body section, and a connection section. The head section is fitted to the cap. The neck section is provided at a rear end of the head section and smaller in diameter than the head section. The flange section is provided at a rear end of the neck section and larger in diameter than the head section. The body section is provided at a rear end of the flange section and smaller in diameter than the flange section. The connection section is provided at a rear end of the body section and connected to the base member. The cap preferably is attached to the head section, and the first fastening member preferably fastens the cloth to the body section near the flange section. This configuration allows for reliable supporting of the cap, thus making it possible to reliably fasten the cloth to the shaft member.

Further, a manufacturing method of a position pointer according to the present disclosure includes attaching a cap made of an elastic material to a tip portion of a shaft. The manufacturing method further includes covering the tip portion of the cap with a cloth first, then fitting an O-ring from a side of the tip portion of the cap, and then moving the O-ring to the position of the shaft member so as to fasten the cloth to the shaft member. The manufacturing method still further includes putting a heat-shrinkable tube over the shaft member in such a manner as to cover the hem portion of the cloth and the O-ring. The manufacturing method still further includes attaching the shaft member, to which the cloth-covered cap has been attached, to the tip portion of a rod-shaped housing. This method allows for reliable fastening of the cloth covering the cap to the shaft member. Further, wrinkles of the cloth covering the cap can be stretched when the O-ring is fitted, thus enhancing close contact of the cloth with the cap surface.

The manufacturing method of a position pointer according to the present disclosure preferably further includes adjusting one or more cloth wrinkles and a cloth hem portion length before putting the heat-shrinkable tube. This method allows for well-balanced arrangement of the cloth wrinkles and reliable fastening of the cloth hem portion using the heat-shrinkable tube, providing a better look of the cloth-covered cap as a whole.

Advantageous Effect

The present disclosure provides a position pointer that offers improved durability and operability of its contact member through a simple configuration and at low cost, and a manufacturing method thereof.

BRIEF DESCRIPTION OF THE DRAWINGS

FIG. 1a is an external view, and FIG. 1b is a schematic side sectional view, according to at least one embodiment of the present disclosure.

DETAILED DESCRIPTION

A detailed description will be given below of a preferred embodiment of the present disclosure with reference to the accompanying drawings.

Figure 1A:
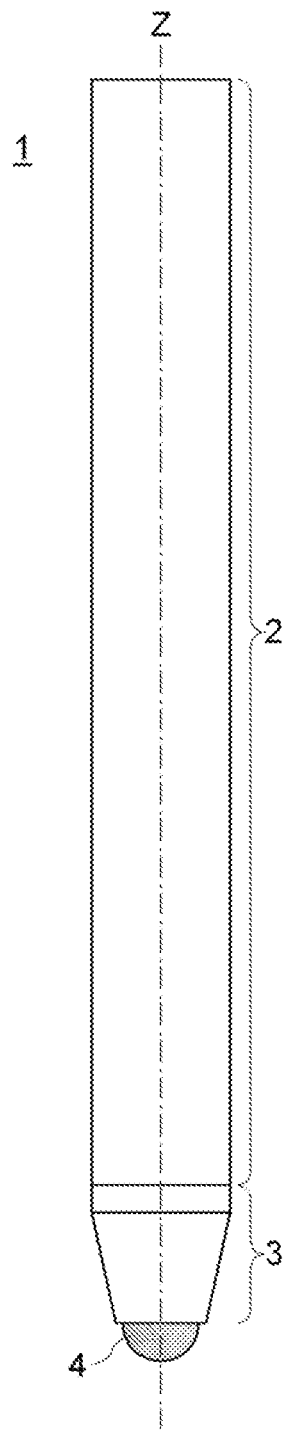
FIGS. 1a and 1b depict side views illustrating an overall configuration of a position pointer according to an embodiment of the present disclosure, and in particular.
Figure 1B:
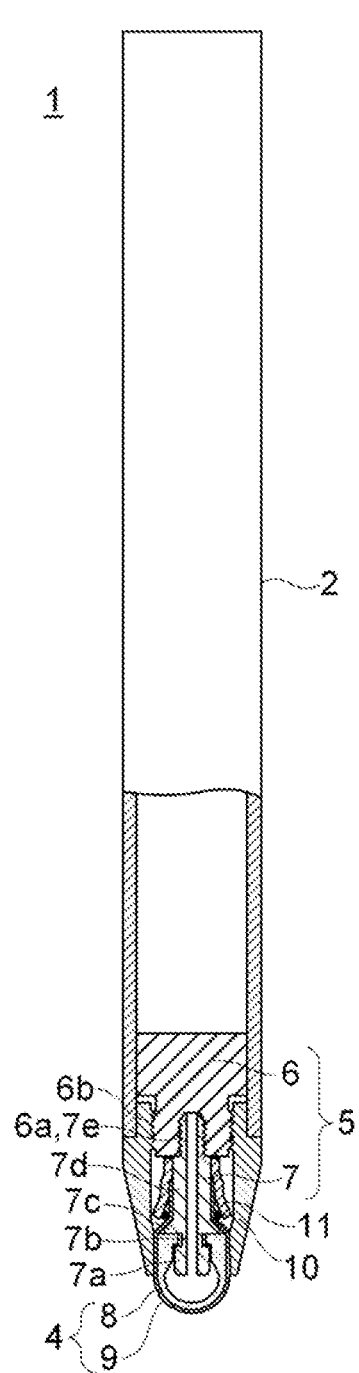

FIGS. 1a and 1b depict side views illustrating an overall configuration of a position pointer 1 according to an embodiment of the present disclosure, and in particular, FIG. 1a is an external view, and FIG. 1b is a schematic side sectional view. Further, FIG. 2 is a schematic side sectional view illustrating a structure of a pen tip component detached from the position pointer 1.

Figure 2:
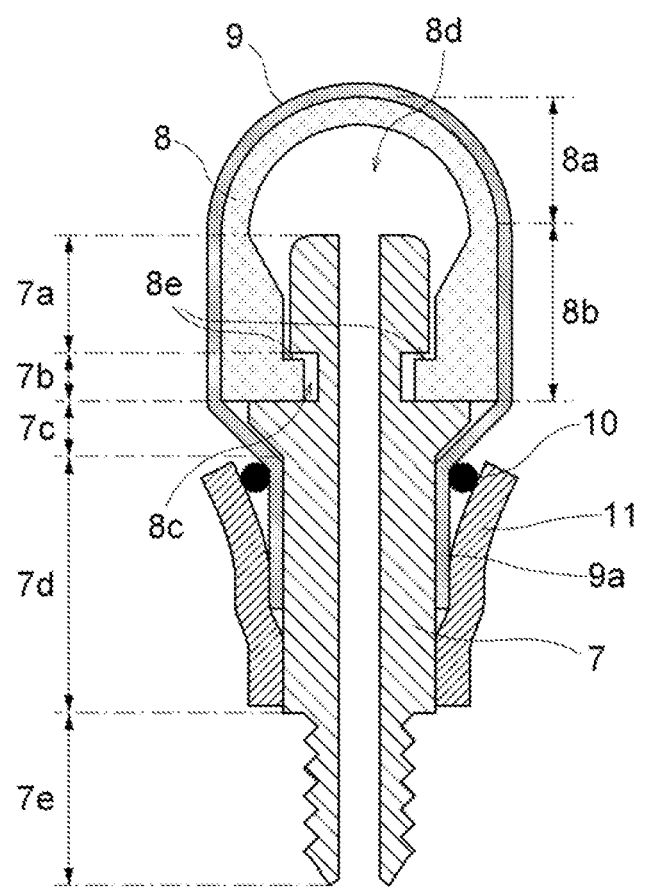
FIG. 2 is a schematic side sectional view illustrating a structure of a pen tip component detached from the position pointer shown in FIGS. 1a and 1b.

As illustrated in FIGS. 1a, 1b, and 2, the position pointer 1 is a pen-type position pointer (stylus pen) and includes an oblong rod-shaped housing 2, a sleeve 3, and a contact member 4. The sleeve 3 is connected to one longitudinal end side (tip portion) of the housing 2. The contact member 4 is provided in such a manner as to protrude from the tip portion of the sleeve 3.

The housing 2 is a metallic hollow cylindrical member, with a support member 5 provided at a tip portion of the housing 2 to support the contact member 4. The support member 5, is a metallic member, should preferably be made of a relatively heavy metal such as brass. If the support member 5 is made of a relatively heavy metal, the center of gravity of the position pointer 1 can be placed at one end side (pen tip side) of the housing 2, thus making the position pointer 1 easy to hold.

The sleeve 3 is an approximately cylindrical member with a tapered outer shape and is provided in such a manner as to be attachable to and detachable from the support member 5 provided at the tip portion of the housing 2. The contact member 4 is provided at the tip portion of the support member 5 and penetrates the sleeve 3, protruding from the tip portion of the sleeve 3. The sleeve 3 is in contact with a side face (outer perimeter face) of the contact member 4, thus supporting the contact member 4. The sleeve 3 also covers the side face (outer perimeter face) of the contact member 4.

The contact member 4 includes a combination of a cap 8 and a conductive cloth 9. The cap 8 protects the pointing input surface of the position detector against damage and contributes to an increased contact area with the pointing input surface. On the other hand, the conductive cloth 9 protects the surface of the cap 8, thus allowing the contact member 4 to move smoothly over the pointing input surface.

The support member 5 includes a combination of a base member 6 and a shaft member 7. The base member 6 is attached to the housing 2. The shaft member 7 is provided on the base member 6 in an attachable and detachable manner. The contact member 4 attached to the tip portion of the shaft member 7 makes up a pen tip component that is attachable to and detachable from a main body (housing 2) of the position pointer. The base member 6 may be completely fastened inside the housing 2. Alternatively, if the position pointer 1 has a writing pressure detection function, the base member 6 may be slidably supported inside the housing 2. In this case, the base member 6 is biased toward the tip of the housing 2, for example, by a coil spring, thus causing the base member 6 to be displaced in the direction of a central axis (Z axis) of the housing 2 in accordance with the writing pressure.

The shaft member 7 includes, from the tip side to the root side, a head section 7a, a neck section 7b, a flange section 7c, a body section 7d, and a male thread section (connection section) 7e, in this order. The neck section 7b is smaller in diameter than the head section 7a. The flange section 7c is larger in diameter than the head section 7a. The body section 7d is smaller in diameter than the flange section 7c. On the other hand, the base member 6 has a female thread section 6a for the male thread section 7e of the shaft member 7 and a male thread section 6b for a female thread section 3a of the sleeve 3. The shaft member 7 and the sleeve 3 are screwed to the base member 6.

The cap 8 includes an approximately semicircular (dome-shaped) tip portion 8a and an approximately cylindrical root portion 8b. The tip portion 8a of the cap 8 is exposed from an opening on the tip side of a penetrating hole of the sleeve 3. It should be noted that the tip side of the cap 8 need only have a curved surface and is not limited to being semicircular. The cap 8 is made of an elastic member such as silicone rubber and is fitted to the head section 7a of the shaft member 7. The cap 8 should preferably be made of a conductive elastic member. If the cap 8 is conductive, the capacitance between the contact member 4 and a sensor electrode of the pointing input surface can be increased. Charge moves from a human body to the pointing input surface via the housing 2, the support member 5, and the cap 8. Therefore, a change in capacitive coupling between the contact member 4 and the sensor electrode can be reliably detected in the same manner as when a human fingertip touches or approaches the pointing input surface.

An opening 8c is provided on a bottom face of the root portion 8b of the cap 8. The opening 8c extends toward the tip portion 8a to communicate with a cavity 8d inside the tip portion 8a. An inner perimeter portion of the opening 8c of the cap 8 forms a ring-shaped protruding portion 8e that projects toward the center. As the ring-shaped protruding portion 8e fits into the neck section 7b of the shaft member 7, the cap 8 is fitted onto the shaft member 7. In the present embodiment, the tip portion 8a of the cap 8 is thinner than the root portion 8b. However, the tip portion 8a of the cap 8 may be identical in thickness to the root portion 8b.

The head section 7a of the shaft member 7 is inserted in the opening 8c of the cap 8, and the cap 8 is fitted into the neck section 7b of the shaft member 7. With the cap 8 fitted onto the shaft member 7, all the space of the cavity inside the cap 8 is not occupied by the head section 7a. Instead, there is a cavity in which the head section 7a does not exist. This makes it possible to increase the elastic deformation when the contact member 4 is pressed against the pointing input surface of the position detector, thus contributing to an increased contact area with the pointing input surface.

The bottom face of the cap 8 attached to the shaft member 7 is in contact with a horizontal face of the flange section 7c. Further, an outer perimeter face of the root portion 8b of the cap 8 is in contact with an inner perimeter face of the tip portion of the sleeve 3 via the conductive cloth 9. As the flange section 7c of the shaft member 7 and the sleeve 3 support the bottom and outer perimeter faces of the cap 8, respectively, the cap 8 pressed against the pointing input surface can be reliably supported, thus contributing to increased elastic deformation of the cap 8.

The conductive cloth 9 wraps the cap 8 and is in close contact with a front face (curved face) of the tip portion 8a of the cap 8. The conductive cloth 9 may be a woven or unwoven cloth. However, the conductive cloth 9 should preferably be approximately circular in planar shape when spread out. Because the front face of the cap 8 is covered with the conductive cloth 9, it is possible to reduce the contact resistance of the contact member 4 to the pointing input surface of the position detector, thus keeping its wear to a minimum and providing a smooth writing feel. Further, because the conductive cloth 9 is conductive, it is possible to further increase the capacitance between the contact member 4 and the sensor electrode of the pointing input surface, allowing for reliable detection of the change in capacitive coupling between the contact member 4 and the sensor electrode.

The conductive cloth 9 is fastened to the body section 7d of the shaft member 7 by clamping with an O-ring 10. The O-ring 10 is a fastening member (first fastening member) to fasten the conductive cloth 9 and should preferably be made of an elastic member such as silicone rubber. To ensure proper tension of the conductive cloth 9 and reliable fastening thereof, the O-ring 10 should preferably be arranged on the body section 7d near a boundary with the flange section 7c. Using the O-ring 10 as a fastener of the conductive cloth 9 allows for easy and reliable fastening of the conductive cloth 9 and makes it easy to adjust wrinkles of the conductive cloth 9 and the length of a hem portion 9a.

The O-ring 10 and the hem portion 9a of the conductive cloth 9 are covered with a heat-shrinkable tube 11 and fastened thereby. The heat-shrinkable tube 11 is a fastening member (second fastening member) that reliably fastens the conductive cloth 9 and prevents positional deviation and degradation over time of the O-ring 10. Therefore, the width of the heat-shrinkable tube 11 is roughly the same as the length of the body section 7d of the shaft member 7.

The hem portion 9a of the conductive cloth 9 fastened by the O-ring 10 is spread out more or less. Therefore, if the heat-shrinkable tube 11 is not used, the conductive cloth 9 is not stably attached. Moreover, the conductive cloth 9 does not have an excellent look. In particular, the pen tip component can be attached to and detached from the main body. When the pen tip component is detached, the hem portion 9a of the conductive cloth 9 is also exposed. This gives a poor look, adversely affecting the product reliability. However, if the hem portion 9a of the conductive cloth 9 is fastened with the heat-shrinkable tube 11, the hem portion 9a of the conductive cloth 9 can be brought into close contact with the outer perimeter face of the body section 7d of the shaft member 7, thus giving a better look to the replaceable pen tip component. Further, covering the O-ring 10 together with the conductive cloth 9 prevents positional deviation of the O-ring 10, reliably fastening both the conductive cloth 9 and the O-ring 10.

In the present embodiment, the cap 8 covered with the conductive cloth 9 is attached to the shaft member 7 of the support member 5, making the cap 8 attachable to and detachable from the housing 2. In conventional position pointers, the cap 8 is not covered with the conductive cloth 9 (nudity). Therefore, the cap 8 can be readily detached from the support member 5. In contrast, if covered with the conductive cloth 9, the cap 8 cannot be detached alone for replacement. For this reason, in the present embodiment, the cap 8 can be detached together with part of the support member 5, allowing for easy replacement of the worn or damaged contact member 4.

FIGS. 3a to 3e depict explanatory diagrams of a manufacturing method of the position pointer 1.

Figure 3A:
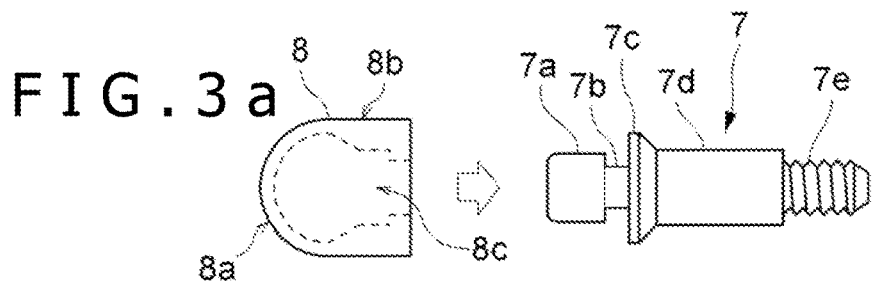
FIGS. 3a to 3e depict explanatory diagrams of a manufacturing method of position pointer, according to at least one embodiment of the present disclosure.

In manufacturing the position pointer 1, the cap 8 is fitted onto the head section 7a of the shaft member 7 first as illustrated in FIG. 3a. The head section 7a is fitted into the opening 8c of the cap 8 and fastened.

Figure 3B:
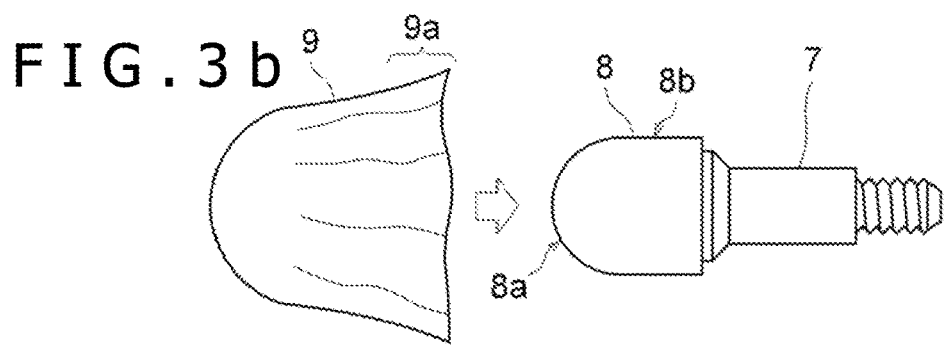

Next, the conductive cloth 9 is put over the cap 8 as illustrated in FIG. 3b. At this time, the hem portion 9a of the conductive cloth 9 is bundled at a rear end side of the shaft member 7.

Figure 3C:
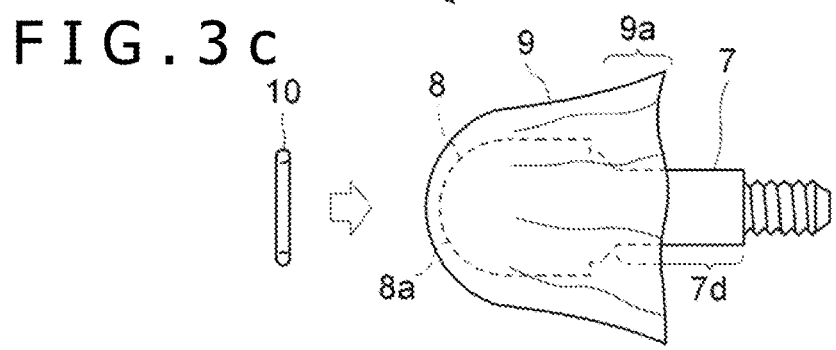

Next, as illustrated in FIG. 3c, the O-ring 10 is attached to the shaft member 7 to fasten the conductive cloth 9. The O-ring 10 is fitted from a side of the head section 7a as illustrated. The O-ring 10 rolls over the curved face of the tip portion of the cap 8, moves toward the rear end of the shaft member 7, and is fed to a position on the body section 7d. Thanks to the action of the O-ring 10 at this time, the wrinkles of the conductive cloth 9 covering the cap 8 are stretched, thus enhancing close contact of the cap 8 with the conductive cloth 9. Then, after the O-ring 10 is positioned in place, the balance of the wrinkles of the conductive cloth 9 is adjusted, followed by cutting of the hem portion 9a if it is too long, thus lining up the length thereof.

Figure 3D:
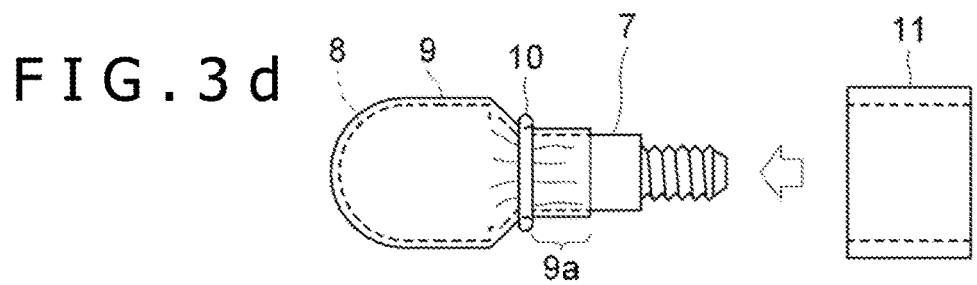
Figure 3E:
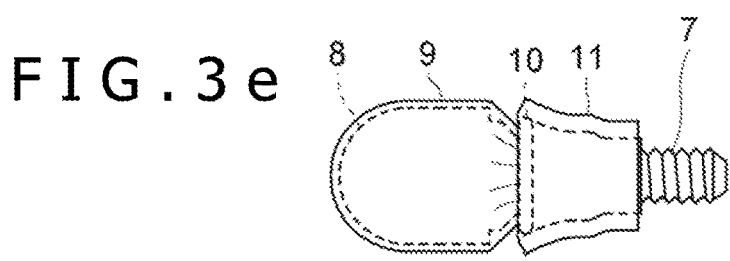

Next, as illustrated in FIG. 3d, the heat-shrinkable tube 11 is put over the hem portion 9a of the conductive cloth 9 and the O-ring 10, and then heated and subjected to heat shrinkage, thus bringing the hem portion of the conductive cloth 9 and the O-ring 10 in close contact with the outer perimeter face of the body section 7*d* of the shaft member 7. Thus, the pen tip component of the position pointer 1 illustrated in FIG. 3*e* is complete.

Then, this pen tip component is attached to the tip portion of the housing 2, and then the sleeve 3 is put over the pen tip component, thus completing the position pointer 1 illustrated in FIG. 1.

As described above, in the position pointer 1 according to the present embodiment, the tip portion of the cap 8 is covered with the conductive cloth 9, thus providing enhanced durability of the contact member 4 and a smooth writing feel. Further, the O-ring 10 is used to fasten the conductive cloth 9 covering the cap 8 to the shaft member 7. This makes it possible to easily and reliably fasten the conductive cloth 9 and adjust the wrinkle positions such that the wrinkles of the conductive cloth 9 are arranged evenly over the entire circumference. Further, it is possible to line up the length of the hem portion 9*a* by cutting the hem portion 9*a* to the proper length with the conductive cloth 9 fastened. Still further, a heat-shrinkable tube is used together with the O-ring 10 to fasten a lower end portion of the conductive cloth 9, reliably fastening the conductive cloth 9 and giving an excellent look.

Thus, the preferred embodiment of the present disclosure has been described above. However, the present disclosure is not limited to the above embodiment and may be modified in various ways without departing from the scope of the gist of the present disclosure. It is needless to say that these modifications are also included in the scope of the present disclosure.

For example, although the conductive cloth 9 is used to cover the tip portion of the cap 8 in the above embodiment, a non-conductive cloth may be used if the cap 8 is conductive. That is, only either the cap 8 or the cloth need be conductive. Because the conductive cloth 9 is sufficiently thin, as long as the cap 8 is conductive, it is possible to achieve a sufficient capacitance between the contact member 4 and the sensor electrode of the pointing input surface.

Further, although the O-ring 10 is used to fasten the conductive cloth 9 in the above embodiment, a C-ring, a cable tie, or other fastener can also be used rather than the O-ring 10. Still further, insulating tape such as plastic tape may be wound rather than the heat-shrinkable tube 11. Still further, although only one ring 10 is used in the above embodiment, the two or more O-rings 10 may be used as necessary.

Still further, although the support member 5 includes a combination of the base member 6 and the shaft member 7 and the contact member 4 can be attached to and detached from the housing together with the shaft member 7 in the above embodiment, the base member 6 may be integral with the shaft member 7. Alternatively, the pen tip component may be not attachable to and detachable from the main body.

Still further, although the cap 8 is fitted onto the head section 7*a* of the shaft member 7 for connection in the above embodiment, the manner in which the cap 8 and the shaft member 7 are connected is not specifically limited. For example, therefore, a protruding portion may be formed on the cap 8 side, and an insertion hole for the protruding portion on the shaft member 7 side such that the two are connected together by inserting the protruding portion of the cap 8 into the insertion hole of the shaft member 7.

DESCRIPTION OF REFERENCE SYMBOLS

1 Position pointer
2 Housing
3 Sleeve
3*a* Female thread section of sleeve
4 Contact member
5 Support member
6 Base member
6*a* Female thread section
6*b* Male thread section
7 Shaft member
7*a* Head section of shaft member
7*b* Neck section of shaft member
7*c* Flange section of shaft member
7*d* Body section of shaft member
7*e* Male thread section of shaft member
8 Cap
8*a* Tip portion of cap
8*b* Root portion of cap
8*c* Opening of cap
9 Conductive cloth
9*a* Hem portion of conductive cloth
10 O-ring
11 Heat-shrinkable tube

The invention claimed is:

1. A position pointer used for a position pointing operation on a capacitive position detector, the position pointer comprising:
   a rod-shaped housing;
   a sleeve connected to a tip portion of the housing;
   a cap made of an elastic material, the cap protruding from the tip portion of the housing;
   a cloth that covers the cap;
   a support provided inside the housing, the support supporting the cap;
   a first fastener that fastens the cloth to the support; and
   a second fastener that fastens a hem portion of the cloth to the support,
   wherein the second fastener is a heat-shrinkable tube,
   wherein the first fastener is an O-ring that is interposed between the heat-shrinkable tube and the hem portion of the cloth, the heat-shrinkable tube having been heated and subjected to heat shrinkage while the O-ring is interposed between the heat-shrinkable tube and the hem portion of the cloth, and
   wherein at least one of the cap and the cloth is conductive.

2. The position pointer of claim 1, wherein the first fastener is made of an elastic material.

3. The position pointer of claim 1, wherein the second fastener fastens both the hem portion of the cloth and the first fastener.

4. The position pointer of claim 1, wherein the support includes:
   a base attached to the housing; and
   a shaft provided on the base in an attachable and detachable manner, wherein:
      the cap is attached to a tip portion of the shaft, and
      the first fastener fastens the cloth to the shaft.

5. The position pointer of claim 4, wherein the shaft includes:
   a head section;
   a neck section provided at a rear end of the head section, the neck section being smaller in diameter than the head section;
   a flange section provided at a rear end of the neck section, the flange section being larger in diameter than the head section;
   a body section provided at a rear end of the flange section, the body section being smaller in diameter than the flange section; and a connection section provided at a rear end of the body section and connected to the base, wherein:
the cap is attached to the head section, and
the first fastener fastens the cloth to the body section near the flange section.

6. A method of manufacturing a position pointer, the method comprising:
attaching a cap made of an elastic material to a tip portion of a shaft;
covering a tip portion of the cap with a cloth;
after covering the tip portion of the cap with the cloth, placing an O-ring on a side of the tip portion of the cap;
after placing the O-ring on the side of the tip portion of the cap, moving the O-ring to a position on the shaft, the cloth being fastened to the shaft by the O-ring;
putting a heat-shrinkable tube over the shaft, the heat-shrinkable tube covering a hem portion of the cloth and the O-ring, the O-ring being interposed between the heat-shrinkable tube and the hem portion of the cloth;
shrinking the heat-shrinkable tube by heating the heat-shrinkable tube; and
attaching the shaft, to which the cap covered by the cloth is attached, to a tip portion of a rod-shaped housing.

7. The manufacturing method of claim 6, further comprising:
adjusting a wrinkle in the cloth and a length of the hem portion before putting the heat-shrinkable tube over the shaft.

* * * * *